(12) United States Patent
Lin et al.

(10) Patent No.: US 12,062,768 B2
(45) Date of Patent: Aug. 13, 2024

(54) BATTERY, ELECTRICITY-CONSUMING APPARATUS, METHOD FOR MANUFACTURING BATTERY AND SYSTEM OF MANUFACTURING BATTERY

(71) Applicant: Contemporary Amperex Technology Co., Limited, Ningde (CN)

(72) Inventors: Jiubiao Lin, Ningde (CN); Libing Chan, Ningde (CN); Chunhui Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 478 days.

(21) Appl. No.: 17/565,479

(22) Filed: Dec. 30, 2021

(65) Prior Publication Data

US 2023/0036195 A1 Feb. 2, 2023

Related U.S. Application Data

(63) Continuation of application No. PCT/CN2021/109401, filed on Jul. 29, 2021.

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC ........... H01M 10/6556; H01M 10/613; H01M 10/647; H01M 10/658
See application file for complete search history.

(56) References Cited

U.S. PATENT DOCUMENTS

| 2013/0130073 A1 | 5/2013 | Kim et al. | |
| 2017/0176108 A1* | 6/2017 | Palanchon | H01M 10/6567 |
| 2023/0170554 A1* | 6/2023 | Ye | H01M 10/625 |
| | | | 429/120 |

FOREIGN PATENT DOCUMENTS

| CN | 208806286 U | 4/2019 |
| CN | 110148814 A | 8/2019 |

(Continued)

OTHER PUBLICATIONS

The extended European search report for EP Application No. 21797928.5, dated May 8, 2024, 6 pages.

(Continued)

*Primary Examiner* — Jonathan G Jelsma
(74) *Attorney, Agent, or Firm* — East IP P.C.

(57) ABSTRACT

The present application provides a battery, an electricity-consuming apparatus, a method for manufacturing the battery and a system of manufacturing the battery. The battery includes a heat-exchanging component, including a first plate body and two second plate bodies; a battery unit, in which includes a plurality of battery cells sequentially arranged in a second direction, the heat-exchanging component is configured to adjust a temperature of the battery cells, and the second direction intersects with the first direction; and a support component, including a support portion located at a side of the first plate body away from the accommodating space, in which the support portion is connected to the first plate body and is configured to support the heat-exchanging component, and a heat-insulating structure is arranged between the support portion and the first plate body.

13 Claims, 6 Drawing Sheets

(51) Int. Cl.
*H01M 10/625* (2014.01)
*H01M 10/647* (2014.01)
*H01M 10/658* (2014.01)

(52) U.S. Cl.
CPC ....... *H01M 10/647* (2015.04); *H01M 10/658* (2015.04); *H01M 2220/20* (2013.01)

(56) References Cited

FOREIGN PATENT DOCUMENTS

| CN | 111033795 A | 4/2020 |
|---|---|---|
| CN | 210272519 U | 4/2020 |
| CN | 210296436 U | 4/2020 |
| CN | 111525213 A | 8/2020 |
| CN | 111727527 A | 9/2020 |
| CN | 111900302 A | 11/2020 |
| CN | 212161896 U | 12/2020 |
| CN | 112310535 A | 2/2021 |
| CN | 212517339 U | 2/2021 |
| CN | 213483833 U | 6/2021 |
| EP | 2337142 A1 | 6/2011 |
| EP | 3675207 A1 | 7/2020 |
| JP | 2018041651 A | 3/2018 |
| JP | 2021513194 A | 5/2021 |
| KR | 1020130004141 A | 1/2013 |
| KR | 1020180069989 A | 6/2018 |
| WO | 2019065152 A1 | 4/2019 |

OTHER PUBLICATIONS

The International search report for PCT Application No. PCT/CN2021/109401, dated Apr. 15, 2022, 6 pages.
The First Office Action for Jpanese Application No. 2021-563389, dated Sep. 26, 2023, 9 pages.
The First Office Action for Korean Application No. 10-2021-7036575, dated Jan. 9, 2024, 19 pages.

\* cited by examiner

BATTERY, ELECTRICITY-CONSUMING APPARATUS, METHOD FOR MANUFACTURING BATTERY AND SYSTEM OF MANUFACTURING BATTERY

CROSS REFERENCE TO RELATED APPLICATION

The present application is a continuation of International Application No. PCT/CN2021/109401, filed on Jul. 29, 2021, which is hereby incorporated by reference in its entirety.

TECHNICAL FIELD

The present application relates to a technical filed of batteries, and specifically relates to a battery, an electricity-consuming apparatus, a method for manufacturing the battery and a system of manufacturing the battery.

BACKGROUND

A battery cell is widely used in an electronic apparatus, such as a mobile phone, a laptop computer, a battery car, an electric car, an electric airplane, an electric ship, an electric toy car, an electric toy ship, an electric toy airplane, an electric tool and so on. The battery cell may include a nickel-cadmium battery cell, a nickel-hydrogen battery cell, a lithium ion battery cell, and a secondary alkaline zinc-manganese battery cell.

A battery usually includes a plurality of battery cells, and the plurality of battery cells are electrically connected by a bus member. Each of the battery cells generates heat during operation. Therefore, the heat generated by the plurality of battery cells of the battery is likely to accumulate, resulting in increasing the temperature of the battery cells. In the case that an operating temperature of the battery cells is generally in the range of 20-40 degrees, a charge-and-discharge performance of the battery cells is the best, and the operating life of the battery cells is the longest. How to control the operating temperature of the battery cells in the battery within an appropriate range is a technical problem that needs to be solved urgently in a technology filed of the battery.

SUMMARY

The present application provides a battery, an electricity-consuming apparatus, a method for manufacturing the battery and a system of manufacturing the battery, which can improve the heat exchange efficiency and make the battery cells of the battery work at a suitable temperature.

In a first aspect, a battery provided by the present application includes a heat-exchanging component, including a first plate body and two second plate bodies, in which the two second plate bodies are respectively connected to two ends of the first plate body in a first direction, a predetermined angle is formed between each of the second plate bodies and the first plate body, an accommodating space is enclosed by the first plate body and the two second plate bodies, and the first plate body is provided with a first flow passage for a heat-exchanging medium to flow therein;

a battery unit, in which the battery unit is at least partially accommodated in the accommodating space of the heat-exchanging component, the battery unit includes a plurality of battery cells sequentially arranged in a second direction, the heat-exchanging component is configured to adjust a temperature of the battery cells, and the second direction intersects with the first direction; and a support component, including a support portion located at a side of the first plate body away from the accommodating space, in which the support portion is connected to the first plate body and is configured to support the heat-exchanging component, and a heat-insulating structure is arranged between the support portion and the first plate body.

In the above embodiments, the first plate body can exchange heat with the battery cells, so that the battery cell can work at a suitable temperature and improve the operation performance of the battery cells. The two second plate bodies can fix the battery cells from two sides to improve the structural strength and stability of the battery. The support portion can be directly mounted on the electricity-consuming apparatus, so that a traditional housing can be omitted, the space utilization rate can be improved, and the used members can be reduced. The heat-insulating structure can reduce the heat transfer between the heat-exchanging component and the support component, ensure the heat exchange rate between the battery cells and the heat-exchanging component, adjust the battery cells to an appropriate operating temperature in time, and prolong the operation life of the battery.

In some embodiments, the heat-insulating structure includes a gap, and the gap is formed in at least a partial region between the support portion and the first plate body.

In the above embodiments, at least part of the first plate body is separated from the support portion by the gap, so as to reduce a contact area between the first plate body and the support portion, and reduce the heat transfer rate between the first plate body and the support portion.

In some embodiments, the heat-insulating structure further includes a heat-insulating layer, and the heat-insulating layer is arranged in the gap.

In the above embodiments, the heat-insulating layer can hinder the heat transfer between the first plate body and the support portion, and reduce the influence of the support portion on the temperature of the first plate body.

In some embodiments, the first plate body includes a first main body, a first convex portion and a second convex portion, and the first convex portion and the second convex portion protrude from a surface of the first main body away from the accommodating space. In a thickness direction of the first main body, a size of the first convex portion protruding from the first main body is smaller than a size of the second convex portion protruding from the first main body, the second convex portion is configured to support the first main body on a surface of the support portion, and at least part of the gap is formed between the support portion and the first convex portion. The first flow passage is formed at an inside of the first convex portion.

In the above embodiments, by providing the first convex portion, a partial thickness of the first plate body can increase, more space can be provided for the first flow passage, a flow area of the first flow passage can increase, and the heat exchange efficiency can be improved. The first convex portion protrudes toward a side away from the accommodating space, so that the flow area of the first flow passage can increase while avoiding the first flow passage from occupying the accommodating space. The support portion is arranged to be spaced apart from the first convex portion. Therefore, the gravitational loads of the battery cells and other components is transmitted to the support portion through the second convex portion instead of being transmitted to the support portion through the first convex portion, so that it can reduce the force of the first convex portion and reduce the risk of deformation and blockage of the first flow passage. The support portion is arranged to be space apart from the first convex portion, so that it can enlarge a heat transfer path between the support portion and the heat-exchanging medium in the first flow passage, reduce the heat transfer rate between the heat-exchanging medium and the support portion, reduce the influence of the temperature of the support portion on the heat-exchanging medium, and ensure the heat exchange efficiency between the heat-exchanging component and the battery cells.

In some embodiments, the battery further includes two end plates. The two end plates are respectively located at two ends of the battery unit in the second direction, and clamp and hold the battery unit; two ends of each of the end plates in the first direction are respectively connected to the two second plate bodies. Two ends of the support portion in the second direction include mounting regions, the mounting regions extend to outsides of the end plates and are configured to be fixed to an external frame.

In the above embodiments, the heat-exchanging component is connected to the end plates through the second plate bodies, so that it can improve the stability of the first plate body and reduce the risk of separation between the first plate body and the battery cells when the battery is shaken. The mounting regions of the support portion extend to the outsides of the end plates, so that the support portion can be directly fixed to the external frame, avoiding the end plates from interfering with the connection between the support portion and the external frame, and simplifying the structure of the battery.

In some embodiments, the battery further includes a joint. At least part of the first plate body protrudes to the outsides of the end plates and is configured to mount the joint, and the joint communicates with the first flow passage.

In the above embodiments, the joint is mounted at the outsides of the end plates, so an external liquid supply pipeline does not need to pass through the end plates, so that it can simplify the structure of the battery and make the arrangement of the external liquid supply pipeline more flexible.

In some embodiments, each of the mounting regions includes a mounting hole passed through, and the mounting hole is configured to be passed through by an external connector to be fixed to the external frame by the external connector; in the thickness direction of the support portion, the mounting hole is not covered by the heat-exchanging component.

In the above embodiments, the mounting hole is not covered by the heat-exchanging component, so that the heat-exchanging component can be prevented from interfering with mounting the external connector, and a mounting process between the battery and the external frame can be simplified.

In some embodiments, in a direction away from the support portion, each of the end plates and each of the second plate bodies extend beyond the battery cells, and an opening is formed at an end of the two end plates and the two second plate bodies away from the support portion. The battery further includes a cover plate located at a side of the battery unit away from the support portion and connected to the end plates and the second plate bodies to close the opening.

In the above embodiments, the cover plate, the end plates and the heat-exchanging component enclose a liquid enclosed space for accommodating the battery cells to prevent liquid or other foreign objects from affecting the charging or discharging of the battery cells. The battery cells do not need to be protected by the housing, and the battery of the embodiments can be directly mounted to the electricity-consuming apparatus, so that the space utilization rate can be saved and improved, and the used members can be reduced.

In some embodiments, the support component further includes two position-limiting portions, the two position-limiting portions are located at a side of the support portion facing to the heat-exchanging component and connected to the support portion, and in the first direction, the two second plate bodies are located between the two position-limiting portions.

In the above embodiments, the position-limiting portions can restrict the heat-exchanging component and the battery unit from two sides in the first direction. When the battery is shaken, the position-limiting portions can reduce the shaking amplitude of the heat-exchanging component and the battery unit, and improve the stability of the overall battery.

In some embodiments, each of the second plate bodies includes a second main body, a third convex portion and a fourth convex portion, and the third convex portion and the fourth convex portion protrude from a surface of the second main body away from the accommodating space. In a thickness direction of the second main body, a size of the third convex portion protruding from the second main body is smaller than a size of the fourth convex portion protruding from the second main body, so that the fourth convex portion is pressed against the position-limiting portions. A second flow passage communicating with the first flow passage is formed at an inside of the third convex portion.

In the above embodiments, by providing the third convex portion, a partial thickness of each of the second plate bodies can increase, more space can be provided for the second flow passage, the flow area of the second flow passage can increase, and the heat exchange efficiency can be improved. The third convex portion protrudes toward the side away from the accommodating space, so that the flow area of the second flow passage can increase while avoiding the second flow passage from occupying the accommodating space. Since a size of the third convex portion protruding from the second main body is smaller than a size of the fourth convex portion protruding from the second main body, when the battery is shaken, the fourth convex portion can serve as a stopper, reduce the possibility of components at the outsides of the second plate bodies pressing the third convex portion and reduce the risk of deformation and blockage of the second flow passage. The two position-limiting portions clamp and hold the heat-exchanging component from two sides through the fourth convex portion, so as to increase the connecting strength between the heat-exchanging component and the support component and improve the stability. In the embodiments, by providing the fourth convex portion, the third convex portion and the second main body can be separated from the position-limiting portions, and a contact area between the position-limiting portions and the second plate bodies can be reduced, so as to hinder the heat transfer between the second plate bodies and the position-limiting portions and reduce the influence of the position-limiting portions on the temperature of the second plate bodies.

In some embodiments, a second flow passage communicating with the first flow passage is formed at an inside of the second plate bodies.

In the above embodiments, the first plate can exchange heat with the battery cells from below, and the second plate bodies can exchange heat with the battery cells from the sides, so that it can increase the heat exchange area of the battery cells, improve the heat exchange efficiency, reduce the temperature difference of the battery cells in a thickness direction of the first plate body, improve the consistency of the temperature of the battery cells, and improve the working performance of the battery cells. In the embodiments of the present application, by communicating the first flow passage with the second flow passage, there is no need to separately connect the first flow passage and the second flow passage to the external liquid supply pipeline, thereby simplifying the connecting structure between the heat-exchanging component and the external liquid supply pipeline.

In some embodiments, the first flow passage and the second flow passage communicate with each other at a junction between the first plate body and each of the second plate bodies; or the heat-exchanging component further includes a connecting pipeline, communicating the first flow passage with the second flow passage.

In a second aspect, an electricity-consuming apparatus provided by the present application includes the battery according to any one of the above embodiments in the first aspect. The battery is configured to supply electric power.

In a third aspect, a method for manufacturing a battery provided by the present application includes providing a heat-exchanging component, in which the heat-exchanging component includes a first plate body and two second plate bodies, the two second plate bodies are respectively connected to two ends of the first plate body in a first direction, a predetermined angle is formed between each of the second plate bodies and the first plate body, an accommodating space is enclosed by the first plate body and the two second plate bodies, and the first plate body is provided with a first flow passage for a heat-exchanging medium to flow therein;

providing a support component, in which the support component includes a support portion;

connecting the support portion to the first plate body, in which the support portion is located at a side of the first plate body away from the accommodating space and is configured to support the heat-exchanging component, and a heat-insulating structure is arranged between the support portion and the first plate body;

providing a battery unit, in which the battery unit includes a plurality of battery cells sequentially arranged in a second direction, and the second direction intersects with the first direction; and placing the battery unit at least partially in the accommodating space of the heat-exchanging component, in which the heat-exchanging component is configured to adjust a temperature of the battery cells.

In a fourth aspect, a system of manufacturing a battery provided by the present application includes a first providing device for providing a heat-exchanging component, in which the heat-exchanging component includes a first plate body and two second plate bodies, the two second plate bodies are respectively connected to two ends of the first plate body in a first direction, a predetermined angle is formed between each of the second plate bodies and the first plate body, an accommodating space is enclosed by the first plate body and the two second plate bodies, and the first plate body is provided with a first flow passage for a heat-exchanging medium to flow therein;

a second providing device for providing a support component, in which the support component includes a support portion;

a first assembling device for connecting the support portion to the first plate body, in which the support portion is located at a side of the first plate body away from the accommodating space and is configured to support the heat-exchanging component, and a heat-insulating structure is arranged between the support portion and the first plate body;

a third providing device for providing a battery unit, in which the battery unit includes a plurality of battery cells sequentially arranged in a second direction, and the second direction intersects with the first direction; and a second assembling device for placing the battery unit at least partially in the accommodating space of the heat-exchanging component, in which the heat-exchanging component is configured to adjust a temperature of the battery cells.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

In the drawings, the drawings are not drawn to actual scale.

DETAILED DESCRIPTION

In order to make the objects, technical solutions and advantages of the embodiments of the present application more clear, the technical solutions of the embodiments of the present application will be clearly and completely described below in conjunction with the drawings of the embodiments of the present application. It is apparent that the described embodiments are a part of the embodiments of the present application, and not all of them. Based on the described embodiments of the present application, all other embodiments obtained by those skilled in the art fall within the scope of the application.

Unless otherwise defined, technical terms or scientific terms used in the present disclosure should be interpreted according to common meanings thereof as commonly understood by those of ordinary skills in the art. The terms used in the description in the present application are only for the purpose of describing specific embodiments and are not intended to limit the present application. The terms "comprise", "include" and "have" and any variations thereof used in the description and the claims of the present application and the above description of the drawings are intended to cover non-exclusive inclusions. The terms "first", "second", etc. in the description and the claims of the present application or the above-mentioned drawings are used to distinguish different objects, rather than to describe a specific order or a primary-secondary relationship.

The "embodiments" referred in the present application means that specific features, structures or characteristics described in conjunction with the embodiments may be included in at least one embodiment of the present application. The reference to such an expression in various places of the description does not necessarily mean the same embodiment, nor is it an independent or alternative embodiment mutually exclusive with other embodiments.

In the description of the present application, it should be noted that, unless otherwise clearly specified and limited, the terms "mount", "connecting" and "connection" and "attach" should be understood in a broad sense, for example, it can be a fixed connection, a detachable connection, or an integral connection, it can be connected directly, it can be connected indirectly through an intermedium, or it can be a communication between two elements at insides thereof. For those of ordinary skill in the art, the specific meaning of the above-mentioned terms in the present application can be understood according to specific situations.

The term "and/or" in the present application is merely an association relationship describing associated objects, which means that there can be three types of relationships. For example, "A and/or B" can mean three cases that there is only A, there are A and B at the same time, and there is only B. In addition, the punctuation mark "I" in the present application generally indicates that the related objects of the preceding content and following content are in an "or" relationship.

In the embodiments of the present application, the same reference numerals denote the same components, and for the sake of brevity, in different embodiments, detailed descriptions of the same components are omitted. It should be understood that the thickness, length, width and other dimensions of the various components in the embodiments of the present application shown in the drawings, as well as the overall thickness, length and width, etc., of the integrated device are only exemplary descriptions, and should not constitute any limitation to the present application.

The "plurality" in the present application refers to two or more (including two).

In the present application, a battery cell may include a lithium ion secondary battery cell, a lithium ion primary battery cell, a lithium sulfur battery cell, a sodium lithium ion battery cell, a sodium ion battery cell or a magnesium ion battery cell, etc., which is not limited in the embodiment of the present application. The battery cell can be in a shape of cylinder, flat shape, cuboid, or other shapes, which is not limited in the embodiments of the present application. There are generally three types of the battery cell in terms of packaging manners: cylindrical battery cell, square battery cell, and soft-packed battery cell, which are not limited in the embodiments of the present application.

A battery mentioned in the embodiments of the present application refers to a single physical module that includes one or more battery cells to provide higher voltage and capacity. The battery generally includes a housing for packaging one or more battery cells. The housing can prevent liquid or other foreign objects from affecting the charging or discharging of the battery cells.

The battery cell includes an electrode assembly and an electrolyte, and the electrode assembly includes a positive electrode sheet, a negative electrode sheet and a separator. The battery cell mainly relies on the movement of metal ions between the positive electrode sheet and the negative electrode sheet to work. The positive electrode sheet includes a positive electrode current collector and a positive electrode active material layer. The positive electrode active material layer coats a surface of the positive electrode current collector. The positive electrode current collector includes a positive electrode current collecting portion and a positive electrode tab protruding from the positive electrode current collecting portion. The positive electrode current collecting portion is coated with the positive electrode active material layer, and at least part of the positive electrode tab is not coated with the positive electrode active material layer. Taking a lithium ion battery as an example, a material of the positive electrode current collector may be aluminum, the positive electrode active material layer includes a positive electrode active material, and the positive electrode active material may be lithium cobaltate, lithium iron phosphate, ternary lithium, lithium manganite or the like. The negative electrode sheet includes a negative electrode current collector and a negative electrode active material layer. The negative electrode active material layer coats a surface of the negative electrode current collector. The negative electrode current collector includes a negative electrode current collecting portion and a negative electrode tab protruding from the negative electrode current collecting portion. The negative electrode current collecting portion is coated with the negative electrode active material layer, and at least part of the negative electrode tab is not coated with the negative electrode active material layer. A material of the negative electrode current collector may be copper, the negative electrode active material layer includes the negative electrode active material, and the negative electrode active material may be carbon or silicon, etc. In order to ensure that a large current is passed without fusing, the number of the positive electrode tabs is multiple, and the positive electrode are stacked together; the number of the negative electrode tabs is multiple, and the negative electrode tabs are stacked together. A material of the separator may be PP (polypropylene) or PE (polyethylene), etc. In addition, in the embodiments of the present application, the electrode assembly may be, nut not limited to, a winding-type structure or a laminated-type structure.

The battery cell may generate heat during a process of charging and discharging. When a plurality of battery cells are used in sets, the heat may gather together. If the heat is not removed effectively, it will cause a temperature of the battery cells to rise and the aging of the battery cells to be accelerated. In addition, the too high temperature may easily cause the runaway heat, and cause the safety risk. When the battery cells are in a low temperature environment, the operation life will be shortened and the discharge capacity will be weakened.

The inventors tried to arrange a heat-exchanging component in the battery to control an operating temperature of the battery cells within an appropriate range. Specifically, a flow passage is usually formed at an inside of the heat-exchanging component. When an external heat exchange media flows through the flow passage of the heat-exchanging component, a heat-exchanging medium exchanges heat with the battery cells through the heat-exchanging component to adjust the temperature of the battery cells. The heat-exchanging component usually needs to be arranged on a load-bearing structure, and the load-bearing structure is configured to support the heat-exchanging component and the battery cells. However, the inventor found that the heat-exchanging component is easily affected by a temperature of the load-bearing structure. The heat-exchanging component exchanges heat with the battery cells and the load-bearing structure at the same time, resulting in that the heat exchange rate between the battery cells and the heat-exchanging component may decrease, and the operating temperature of the battery cells cannot be adjusted in time.

In view of these, the battery provided by the present application includes the heat-exchanging component, including a first plate body and two second plate bodies, in which the two second plate bodies are respectively connected to two ends of the first plate body in a first direction, a predetermined angle is formed between each of the second plate bodies and the first plate body, an accommodating space is enclosed by the first plate body and the two second plate bodies, and the first plate body is provided with a first flow passage for the heat-exchanging medium to flow therein; a battery unit, in which the battery unit is at least partially accommodated in the accommodating space of the heat-exchanging component, the battery unit includes the plurality of battery cells sequentially arranged in a second direction, the heat-exchanging component is configured to adjust the temperature of the battery cells, and the second direction intersects with the first direction; and a support component, including a support portion located at a side of the first plate body away from the accommodating space, in which the support portion is connected to the first plate body and is configured to support the heat-exchanging component, and a heat-insulating structure is arranged between the support portion and the first plate body. In the embodiments of the present application, the heat-insulating structure is arranged between the heat-exchanging component and the support component, so as to reduce the heat exchange between the heat-exchanging component and the support component, ensure the heat exchange rate between the battery cells and the heat-exchanging component, and adjust the battery cells to the appropriate operating temperature in time.

The battery described in the embodiments of the present application is suitable for an electricity-consuming apparatus applying the battery.

The Electricity-consuming apparatus may be a vehicle, a mobile phone, a portable device, a notebook computer, a ship, a spacecraft, an electric toy, an electric tool or the like. The vehicle may be a fuel car, a gas car or a new energy car, and the new energy car can be a pure electric car, a hybrid car, a range-extended car or the like; the spacecraft may include an airplane, a rocket, a space shuttle, a space ship or the like; the electric toy may include a fixed-type or mobile-type electric toy, such as a game player, an electric car toy, an electric ship toy, an electric airplane toy or the like; the power tool may include a metal cutting power tool, a grinding power tool, an assembly power tool and a railway power tools, such as an electric drill, an electric grinder, an electric wrench, an electric screwdriver, an electric hammer, an impact drill, a concrete vibrator, an electric planers or the like. The embodiments of the present application do not impose special limitation on the above-mentioned electricity-consuming apparatus.

For convenience of description, the following embodiments take the vehicle selected from the electricity-consuming apparatus as an example for description.

Figure 1:
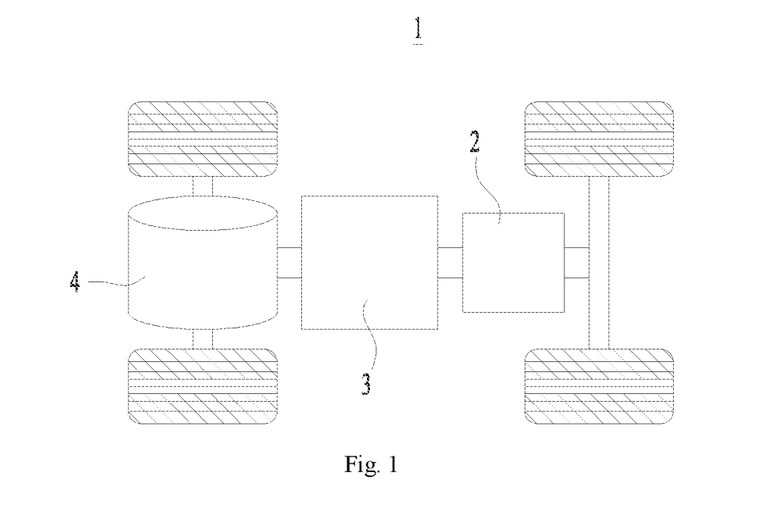
FIG. 1 shows a structural schematic view of a vehicle according to some embodiments of the present application.

FIG. 1 shows a structural schematic view of the vehicle according to some embodiments of the present application. As shown in FIG. 1, the battery 2 is arranged at an inside of the vehicle 1, and the battery 2 may be arranged at a bottom, a head or a tail of the vehicle 1. The battery 2 may be used for the power supply of the vehicle 1, for example, the battery 2 may be used as an operating power source of the vehicle 1.

The vehicle 1 may further include a controller 3 and a motor 4, and the controller 3 is configured to control the battery 2 to supply power to the motor 4, for example, for the working-power requirements of the vehicle 1 during starting, navigating and driving.

In some embodiments of the present application, the battery 2 can be used not only as the operating power source for the vehicle 1, but also as a driving power source for the vehicle 1, replacing or partially replacing fuel or natural gas to provide the driving power to the vehicle 1.

Figure 2:
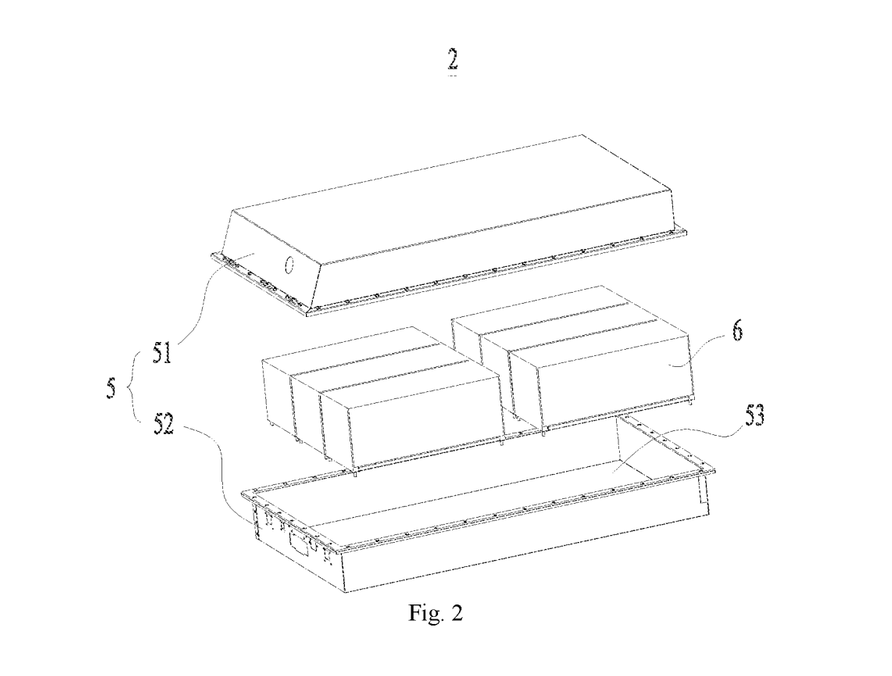
FIG. 2 shows an exploded schematic view of a battery according to some embodiments of the present application.

FIG. 2 shows an exploded schematic view of the battery according to some embodiments of the present application.

As shown in FIG. 2, the battery 2 includes the housing 5 and the battery cells (not shown in FIG. 2), and the battery cells are contained in the housing 5.

The housing 5 is configured to accommodate the battery cells, and the housing 5 can be of various structures. In some embodiments, the housing 5 may include a first housing portion 51 and a second housing portion 52, the first housing portion 51 and the second housing portion 52 are covered and closed to each other, an accommodating space 53 for accommodating the battery cells are defined by the first housing portion 51 and the second housing portion 52 together. The second housing portion 52 may be of a hollow structure with an opening at an end thereof, the first housing portion 51 is a plate-shaped structure, and the first housing portion 51 covers and closes at an opening side of the second housing portion 52 to form the housing 5 with the accommodation space 53; or each of the first housing portion 51 and the second housing portion 52 may be of a hollow structure with an opening at a side, an opening side of the first housing portion 51 is covered and closed by an opening side of the second housing portion 52 to form the housing 5 with the accommodating space 53. Certainly, the first housing portion 51 and the second housing portion 52 may be of various shapes, such as a cylinder, a rectangular parallelepiped or the like.

In order to improve the sealing performance after the first housing portion 51 and the second housing portion 52 are connected, a sealing member, such as a sealant, a sealing ring or the like, may also be arranged between the first housing portion 51 and the second housing portion 52.

Assuming that the first housing portion 51 covers and closes on a top of the second housing portion 52, the first housing portion 51 can also be referred to as an upper housing cover, and the second housing portion 52 can also be referred to as a lower housing.

In the battery 2, there are the plurality of battery cells. The plurality of battery cells can be connected in series or in parallel or in hybrid. A hybrid connection means that the plurality of battery cells are connected in series and in parallel. the plurality of battery cells can be directly connected in series or in parallel or in hybrid together, and then the whole composed of the plurality of battery cells can be accommodated in the housing 5; certainly, it is also possible that the plurality of battery cells are connected in series or in parallel or in hybrid to form a battery module 6, and then a plurality of battery modules 6 are connected in series or in parallel or in hybrid to form a whole and accommodated in the housing 5.

The housing 5 of the battery 2 is configured to be mounted on the electricity-consuming apparatus. For example, the housing can be mounted on a chassis of the vehicle through a fastening member. The housing 5 can prevent liquid or other foreign objects from affecting the charging or discharging of the battery cells.

Figure 3:
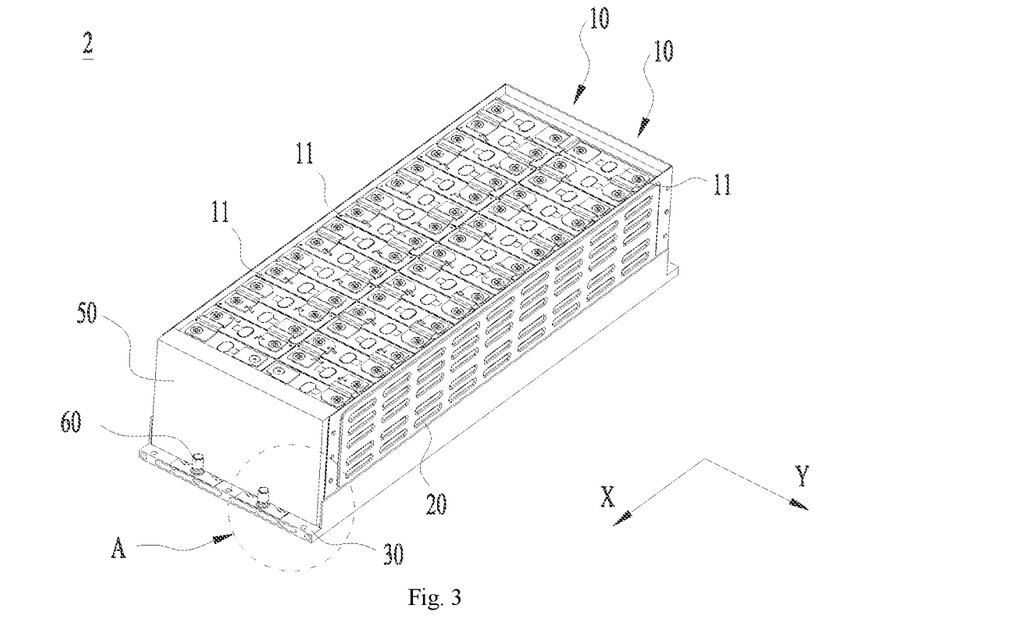
FIG. 3 shows a structural schematic view of a battery according to some other embodiments of the present application.
Figure 4:
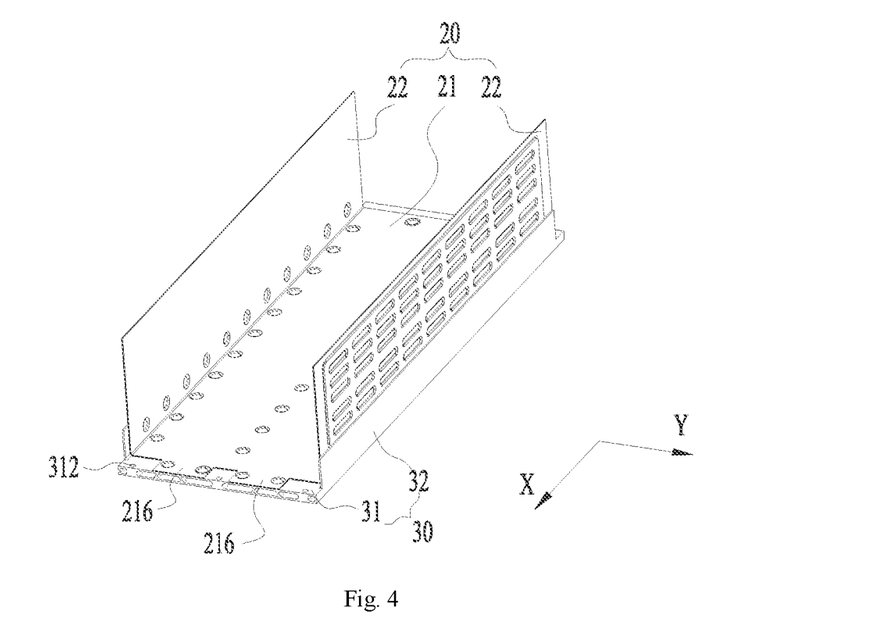
FIG. 4 shows a structural schematic view of a heat-exchanging component and a support component of the battery shown in FIG. 3.
Figure 5:
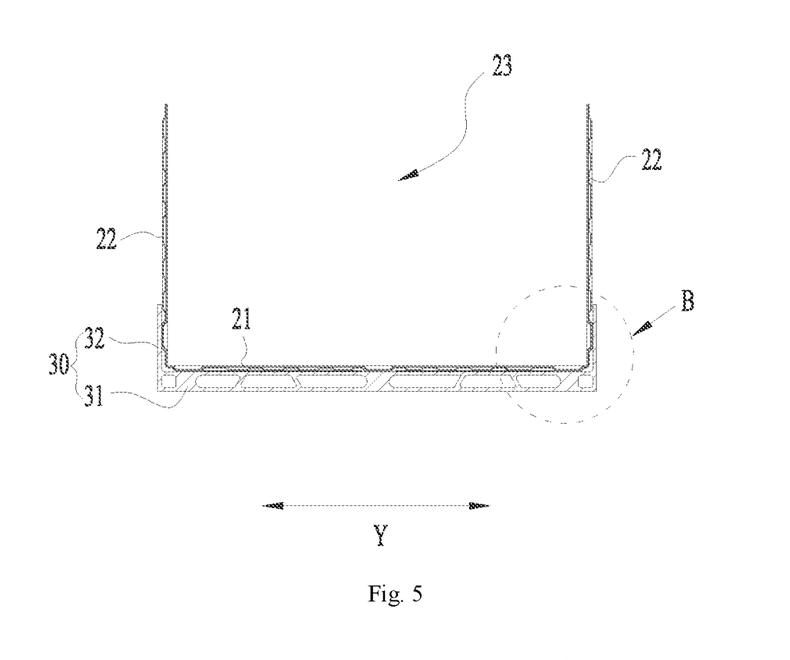
FIG. 5 shows a schematic cross-sectional view of the heat-exchanging component and the support component shown in FIG. 4.
Figure 6:
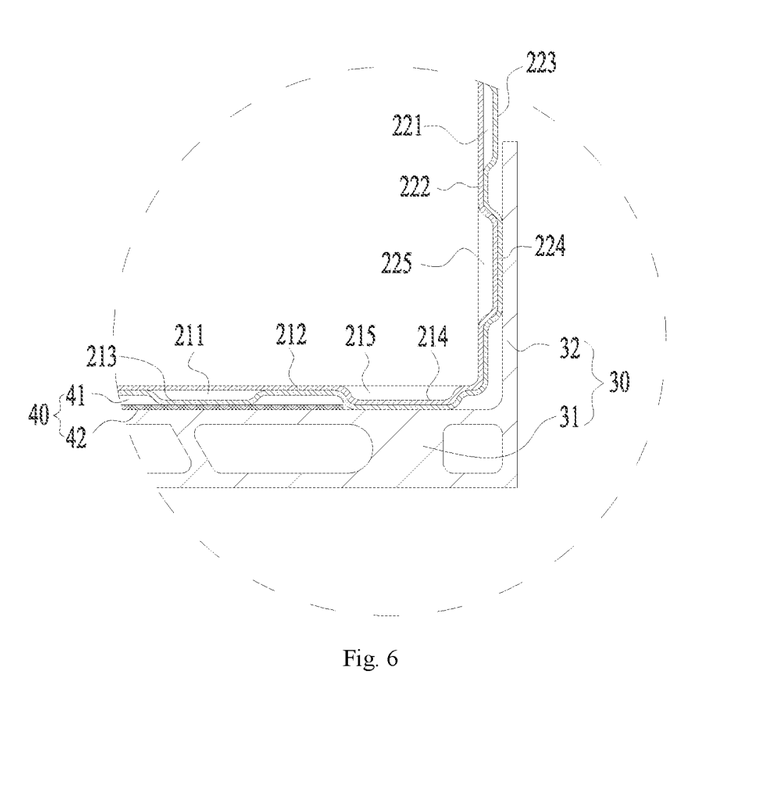
FIG. 6 shows an enlarged schematic view of FIG. 5 at a circular portion B.

FIG. 3 shows a structural schematic view of the battery according to some other embodiments of the present application; FIG. 4 shows a structural schematic view of the heat-exchanging component and the support component of the battery shown in FIG. 3; FIG. 5 shows a schematic cross-sectional view of the heat-exchanging component and the support component shown in FIG. 4; FIG. 6 shows an enlarged schematic view of FIG. 5 at a circular portion B.

As shown in FIG. 3 to FIG. 6, the battery 2 provided by the present application includes the heat-exchanging component 20, including the first plate body 21 and two second plate bodies 22, in which the two second plate bodies 22 are respectively connected to two ends of the first plate body 21 in the first direction Y, the predetermined angle is formed between each of the second plate bodies 22 and the first plate body 21, the accommodating space 23 is enclosed by the first plate body 21 and the two second plate bodies 22, and the first plate body 21 is provided with the first flow passage 211 for the heat-exchanging medium to flow therein; the battery unit 10, in which the battery unit 10 is at least partially accommodated in the accommodating space 23 of the heat-exchanging component 20, the battery unit 10 includes the plurality of battery cells 11 sequentially arranged in the second direction X, the heat-exchanging component 20 is configured to adjust the temperature of the battery cells 11, and the second direction X intersects with the first direction Y; and the support component 30, including the support portion 31 located on the side of the first plate body 21 away from the accommodating space 23, in which the support portion 31 is connected to the first plate body 21 and is configured to support the heat-exchanging component 20, and the heat-insulating structure 40 is arranged between the support portion 31 and the first plate body 21.

The number of the battery unit(s) 10 may be one or more. For example, the battery 2 includes the plurality of battery units 10, and the plurality of battery units 10 are arranged in the first direction Y. Optionally, the first direction Y is perpendicular to the second direction X. For example, in FIG. 3, there are two battery units 10, in other words, the plurality of battery cells 11 are arranged in two rows.

The battery cells 11 are connected to the heat-exchanging component 20. Optionally, the battery cells 11 are bonded to the first plate body 21 and the second plate bodies 22 by a heat-conducting glue.

The plurality of battery cells 11 in the battery 2 can be electrically connected by a bus member, so that the plurality of battery cells 11 in the battery 2 can be connected in parallel or in series or in hybrid.

The heat-exchanging component 20 is configured to adjust the temperature of the battery cells 11 to make the battery cells 11 work at the appropriate temperature. Illustratively, in the battery 2, the first plate body 21 is located below the plurality of battery cells 11 of the battery unit 10, and the first plate body 21 is configured to support the battery cells 11 and adjust the temperature of the battery cells 11.

The first flow passage 211 is configured to communicate with an external liquid supply pipeline, and the heat-exchanging medium can circulate and flow between the first flow passage 211 and the external liquid supply pipeline to exchange heat with the battery cells 11 through the first plate body 21, so that the battery cells can word at the appropriate temperature. The heat-exchanging medium may be of liquid.

The first plate body 21 is made of a heat-conducting material, for example, the first plate body 21 is made of a heat-conducting metal.

In the embodiments, the first flow passage 211 may be formed on the first plate body 21 by means of a process such as extrusion molding, inflation molding, stamping molding or the like.

The first plate body 21 may be integrally arranged with the second plate bodies 22; for example, the first plate body 21 and the second plate bodies 22 are integrally formed by bending a plate. Certainly, the first plate body 21 and the second plate bodies 22 can be arranged separately. For example, the first plate body 21 and the second plate bodies 22 can be connected by means of welding, bonding, clamping or the like.

An angle between each of the second plate bodies 22 and the first plate body 21 can be determined as required, which is not limited in the embodiments. Exemplarily, the angle between each of the second plate bodies 22 and the first plate body 21 may be 80°-100°. The heat-exchanging component 20 is a U-shaped structure substantially.

In the battery 2, the two second plate bodies 22 are respectively located at two sides of the battery unit 10 in the first direction Y, which can serve to fix the battery unit 10 and improve the overall strength of the battery 2. The second plate bodies 22 may also have a heat exchange function to adjust the temperature of the battery cells 11 from the sides. Certainly, the heat exchange function of the second plate bodies 22 may be omitted.

The support portion 31 is connected to the first plate body 21 to improve the structural strength of the battery 2 and prevent the heat-exchanging component 20 from sliding relative to the support portion 31. Exemplarily, the support portion 31 may be connected to the first plate body 21 by means of riveting, bolting, welding, bonding or the like.

The support portion 31 is the load-bearing structure of the battery 2, and is used for loading and bearing the heat-exchanging component 20, the battery cells 11 and other components. The support portion 31 serves as an important role in improving the structural strength of the battery 2 and has a relatively high strength.

The support portion 31 has the high strength, thus, the support portion 31 can be directly mounted on the electricity-consuming apparatus (such as the chassis of the vehicle), so that a traditional housing can be omitted, the space utilization rate can be improved, and used members can be reduced. Alternatively, one or more batteries 2 in the embodiments of the present application can also be assembled into the housing first, and then mounted on the electricity-consuming apparatus through the housing.

The support portion 31 may be in contact with the heat-exchanging component 20 to directly support the heat-exchanging component 20, or may indirectly support the heat-exchanging component 20 through other components.

The heat-insulating structure 40 is configured to separate at least part of the first plate body 21 from the support portion 31 to reduce the heat transfer rate between the support portion 31 and the first plate body 21. The heat-insulating structure 40 may be a solid structure made of a material with a low heat conductivity, or a space structure such as a gap, which is not limited in the embodiments.

In the embodiments of the present application, the first plate body 21 can exchange heat with the battery cells 11, so that the battery cells 11 can work at the appropriate temperature, and the operation performance of the battery cells 11 can be improved. The two second plate bodies 22 can fix the battery cells 11 at two sides, thereby improving the structural strength and the stability of the battery 2. The support portion 31 can be directly mounted on the electricity-consuming apparatus, so that the traditional housing can be omitted, the space utilization rate can be improved, and the used members can be reduced. The heat-insulating structure 40 can reduce the heat transfer between the heat-exchanging component 20 and the support component 30, ensure the heat exchange rate between the battery cells 11 and the heat-exchanging component 20, adjust the battery cells 11 to the appropriate operating temperature in time, and prolong the operation life of the battery 2.

In some embodiments, the heat-insulating structure 40 includes a gap 41, and the gap 41 is formed in at least a partial region between the support portion 31 and the first plate body 21.

The gap 41 may or may not be filled with a heat-insulating material.

The gap 41 separates at least part of the first plate body 21 from the support portion 31 to reduce a contact area between the first plate body 21 and the support portion 31, and reduce the heat transfer rate between the first plate body 21 and the support portion 31.

In some embodiments, the heat-insulating structure 40 further includes a heat-insulating layer 42, and the heat-insulating layer 42 is arranged in the gap 41.

The heat-insulating layer 42 may fill the gap 41 between the first plate body 21 and the support portion 31, or may fill only part of the gap 41.

The heat-insulating layer 42 may be a whole piece or a plurality of pieces which are separated.

The heat conductivity of the heat-insulating layer 42 is smaller than the heat conductivity of the support portion 31 and the heat conductivity of the first plate body 21.

The heat-insulating layer 42 can hinder the heat transfer between the first plate body 21 and the support portion 31 and reduce the influence of the support portion 31 on the temperature of the first plate body 21. It should be noted that the heat-insulating layer 42 does not require the complete heat insulation, as long as the heat-conducting efficiency can be reduced; in some embodiments, the heat-insulating layer 42 may be made of a non-metallic material. For example, the heat-insulating layer 42 can be made of glass fiber, asbestos, rock wool, silicate, aerogel felt or the like.

Optionally, the heat-insulating layer 42 also has a connection function, which can reliably fix the first plate body 21 on the support portion 31 and improve the structural strength of the entire battery 2. For example, the heat-insulating layer 42 is formed by curing an adhesive.

Optionally, the heat-insulating layer 42 also has a buffer function. The heat-insulating layer 42 has a good elasticity. When the battery 2 is shaken, the heat-insulating layer 42 can have a buffering effect to reduce an impact force received by the first plate body 21 and reduce the risk of deformation and blockage of the first flow passage 211.

In some embodiments, the first plate body 21 includes a first main body 212, a first convex portion 213 and a second convex portion 214, and the first convex portion 213 and the second convex portion 214 protrude from a surface of the first main body 212 away from the accommodating space 23. In a thickness direction of the first main body 212, a size of the first convex portion 213 protruding from the first main body 212 is smaller than a size of the second convex portion 214 protruding from the first main body 212, the second convex portion 214 is configured to support the first main body 212 on a surface of the support portion 31, and at least part of the gap 41 is formed between the support portion 31 and the first convex portion 213. The first flow passage 211 is formed at an inside of the first convex portion 213.

The first main body 212 is a flat plate structure substantially, and surfaces of the first main body 212 oppositely arranged in a thickness direction of the first main body 212 are flat surfaces.

There may be one or more first convex portion 213. When there are a plurality of first convex portions 213, each of first convex portions 213 is provided with the first flow passage 211; the first flow passages 211 of the plurality of first convex portions 213 may be connected directly, or may be connected through other communication structures, such as a connecting pipeline or the like.

There may be one or more second convex portion 214. The second convex portion 214 may be circular, rectangular, racetrack-shaped, elliptical or the like. The second convex portion 214 may be connected to the support portion 31 by means of riveting, bolting, welding, bonding or the like. Optionally, the second convex portion 214 is arranged at a lower side of each of the battery cells 11, so that the heat-exchanging component 20 can transmit the gravitational load to the support portion 31 more evenly, so as to reduce the stress concentration.

An extent to which the second convex portion 214 protrudes from the first main body 212 is greater than an extent to which the first convex portion 213 protrudes from the first main body 212. Therefore, the second convex portion 214 can press against the support portion 31 to support and hold the first main body 212 and the first convex portion 213, and to space the first convex portion 213 apart from the support portion 31.

In the embodiments of the present application, by arranging the first convex portion 213, a partial thickness of the first plate body 21 can increase to provide more space for the first flow passage 211, increase a flow area of the first flow passage 211, and improve the heat exchange efficiency. The first convex portion 213 protrudes toward a side away from the accommodating space 23, so that the flow area of the first flow passage 211 can increase while preventing the first flow passage 211 from occupying the accommodating space 23. The support portion 31 is spaced apart from the first convex portion 213. Therefore, the gravitational loads of the battery cells 11 and other components is transmitted to the support portion through the second convex portion 214 instead of being transmitted to the support portion 31 through the first convex portion 213, so that it can reduce the force of the first convex portion 213 and reduce the risk of deformation and blockage of the first flow passage. The support portion 31 is arranged to be space apart from the first convex portion 213, so that it can enlarge a heat transfer path between the support portion 31 and the heat-exchanging medium in the first flow passage 211, reduce the heat transfer rate between the heat-exchanging medium and the support portion 31, reduce the influence of the temperature of the support portion 31 on the heat-exchanging medium, and ensure the heat exchange efficiency between the heat-exchanging component 20 and the battery cells 11.

In some embodiments, the first plate body 21 is provided with a first concave portion 215 at a position corresponding to the second convex portion 214, and the first concave portion 215 is recessed relative to the surface of the first main body 212 facing the accommodation space 23. The first concave portion 215 can reduce the weight of the first plate body 21 and increase the elasticity of the second convex portion 214, so that the second convex portion 214 has the certain buffering effect.

In some embodiments, a second flow passage 221 is formed at an inside the second plate bodies 22. The second flow passage 221 is configured to communicate with the external liquid supply pipeline, and the heat-exchanging medium can circulate and flow between the second flow passage 221 and the external liquid supply pipeline to exchange heat with the battery cells 11 through the second plate bodies 22, so that the battery cells 11 can work at the appropriate temperature.

The second flow passage 221 may communicate with the first flow passage 211 or may not communicate with the first flow passage 211, which is not limited in the embodiments.

In the embodiments, the first plate 21 can exchange heat with the battery cells 11 from below, and the second plate bodies 22 can exchange heat with the battery cells 11 from the sides, so that it can increase the heat exchange area of the battery cells 11, improve the heat exchange efficiency, reduce the temperature difference of the battery cells 11 in a thickness direction of the first plate body 21, improve the consistency of the temperature of the battery cells 11, and improve the working performance of the battery cells 11.

In some embodiments, the second flow passage 221 communicating with the first flow passage 211 is formed at an inside of the second plate bodies 22.

The second flow passage 221 may directly communicate with the first flow passage 211, or may indirectly communicate with the first flow passage 211 through other components, which is not limited in the embodiments.

In the embodiments of the present application, the first flow passage 211 communicates with the second flow passage 221, thus, there is no need to separately connect the first flow passage 211 and the second flow passage 221 to the external liquid supply pipeline, thereby simplifying the connecting structure between the heat-exchanging component 20 and the external liquid supply pipeline.

In some embodiments, the support component 30 further includes two position-limiting portions 32, the two position-limiting portions 32 are located at a side of the support portion 31 facing to the heat-exchanging component 20 and connected to the support portion 31, and in the first direction Y, the two second plate bodies 22 are located between the two position-limiting portions 32.

The position-limiting portion 32 may be integrally formed with the support portion 31, or may be connected to the support portion 31 by means of welding, riveting, bonding or the like.

A certain angle is formed between the position-limiting portion 32 and the support portion 31. Optionally, the angle between the position-limiting portion 32 and the support portion 31 may be 80°-100°.

The position-limiting portions 32 can restrict the heat-exchanging component 20 and the battery unit 10 from two sides in the first direction Y. When the battery 2 is shaken, the position-limiting portions 32 can reduce the shaking amplitude of the heat-exchanging component 20 and the battery unit 10, and improve the stability of the overall battery 2.

The position-limiting portion 32 may be connected to the second plate bodies 22 by means of riveting, bolting, welding, bonding or the like, so as to improve the overall structural strength of the battery 2 and improve stability of the overall battery 2.

In some embodiments, a heat-insulating structure may also be arranged between the position-limiting portion 32 and the second plate bodies 22 to hinder the heat transfer between the second plate bodies 22 and the position-limiting portion 32 and reduce the influence of the position-limiting portion 32 on the temperature of the second plate bodies 22. The heat-insulating structure between the position-limiting portion 32 and the second plate bodies 22 includes, but is not limited to, structures such as the gap, the heat-insulating layer (not shown) and the like.

In some embodiments, each of the second plate bodies 22 includes a second main body 222, a third convex portion 223 and a fourth convex portion 224, and the third convex portion 223 and the fourth convex portion 224 protrude from a surface of the second main body 222 away from the accommodating space 23. In a thickness direction of the second main body 222, a size of the third convex portion 223 protruding from the second main body 222 is smaller than a size of the fourth convex portion 224 protruding from the second main body 222, so that the fourth convex portion 224 is pressed against the position-limiting portion 32. A second flow passage 221 communicating with the first flow passage 211 is formed at an inside of the third convex portion 223.

The second main body 222 is a flat plate structure substantially, and the surfaces of the second main body 222 oppositely arranged in the thickness direction of its own can be flat surfaces.

There may be one or more third convex portions 223. When there is a plurality of third convex portions 223, the second flow passage 221 is formed in each of the third convex portions 223; the second flow passages 221 of the plurality of third convex portions 223 may directly communicate with one another, or may communicate with one another through other communication structures, such as the connecting pipeline or the like.

There may be one or more fourth convex portions 224. The fourth convex portion 224 may be circular, rectangular, racetrack-shaped, elliptical or the like.

An extent to which the fourth convex portion 224 protruding from the second main body 222 is greater than an extent to which the third convex portion 223 protruding from the second main body 222.

In the embodiments of the present application, by arranging the third convex portion 223, a partial thickness of each of the second plate bodies 22 can increase, so as to provide more space for the second flow passage 221, increase the flow area of the second flow passage 221, and improve the heat exchange efficiency. The third convex portion 223 protrudes toward the side away from the accommodating space 23, so that the flow area of the second flow passage 221 can increase while preventing the second flow passage 221 from occupying the accommodating space 23. Since the size of the third convex portion 223 protruding from the second main body 222 is smaller than the size of the fourth convex portion 224 protruding from the second main body 222, when the battery 2 is shaken, the fourth convex portion 224 can serve as a stopper; so as to reduce the possibility of a component at the outsides of the second plate bodies 22 pressing the third convex portion 223, and reduce the risk of deformation and blockage of the second flow passage 221.

The two position-limiting portions 32 clamp and hold the heat-exchanging component 20 from two sides through the fourth convex portion 224, so as to increase the connection strength between the heat-exchanging component 20 and the support component 30 and improve the stability. In the embodiments, by providing the fourth convex portion 224, the third convex portion 223 and the second main bodies 222 can be separated from the position-limiting portion 32, so that the contact area between the position-limiting portion 32 and the second plate bodies 22 can be reduced to hinder the heat transfer between the second plate bodies 22 and the position-limiting portion 32, and reduce the influence of the position-limiting portion 32 on the temperature of the second plate bodies 22.

In the first direction Y, the position-limiting portion 32 may overlap with the third convex portion 223, or may not overlap with the third convex portion 223. Even if the position-limiting portion 32 overlaps with the third convex portion 223 in the first direction Y, the fourth convex portion 224 can support and hold the position-limiting portion 32, so that the position-limiting portion 32 can be spaced apart from the third convex portion 223, thereby preventing the third convex portion 223 from being pressed by the position-limiting portion 32, and reducing the heat transfer between the third convex portion 223 and the position-limiting portion 32.

In some embodiments, the second concave portion 225 is provided with the second plate bodies 22 arranged at a position corresponding to the fourth convex portion 224, and the second concave portion 225 is recessed relative to the surface of the second main body 222 facing to the accommodating space 23. The second concave portion 225 can reduce the weight of the second plate bodies 22 and increase the elasticity of the fourth convex portion 224, so that the fourth convex portion 224 has the certain buffering effect.

Figure 7:
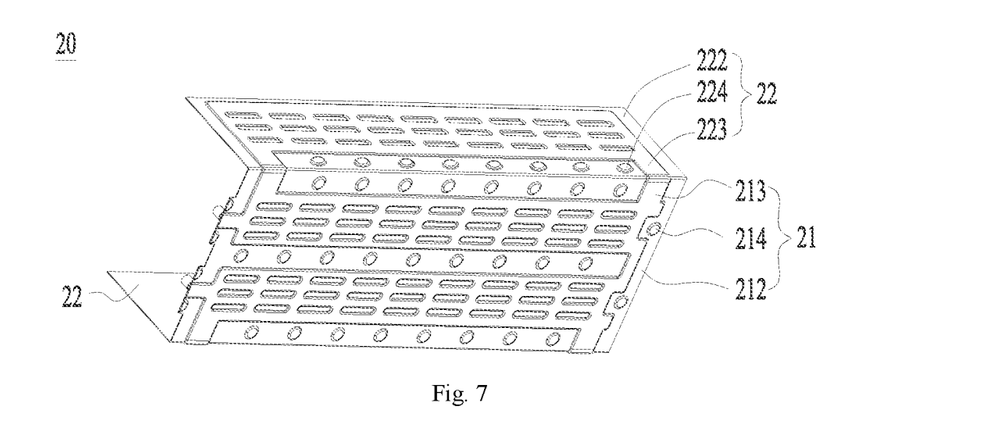
FIG. 7 shows a structural schematic view of a heat-exchanging component of a battery according to some embodiments of the present application.

FIG. 7 shows a structural schematic view of the heat-exchanging component of the battery according to some embodiments of the present application.

As shown in FIG. 7, the first flow passage and the second flow passage communicate with each other at a junction between the first plate body 21 and each of the second plate bodies 22. In the embodiments, the first flow passage directly communicates with the second flow passage at the inside of the heat-exchanging component 20, and there is no need to provide other structures to communicate the first flow passage and the second flow passage, thereby simplifying the structure of the heat-exchanging component 20.

Exemplarily, in FIG. 7, the first flow passage is located at the inside of the first convex portion 213, and the second flow passage is located at the inside of the third convex portion 223; the first convex portion 213 is connected to the third convex portion 223, so that the first flow passage directly communicates with the second flow passage.

Figure 8:
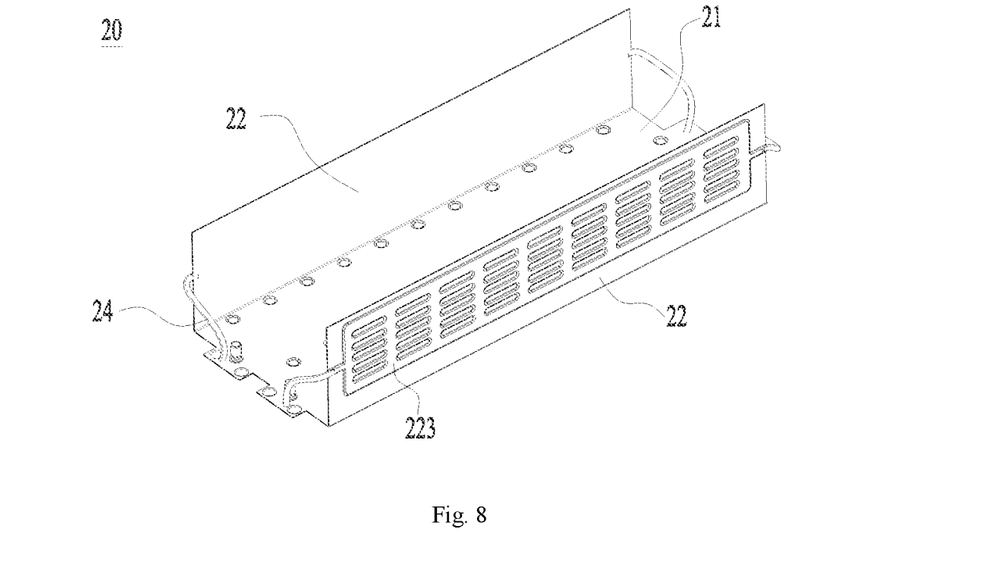
FIG. 8 shows a structural schematic view of a heat-exchanging component of a battery according to some other embodiments of the present application.

FIG. 8 shows a structural schematic view of the heat-exchanging component of the battery according to some other embodiments of the present application.

As shown in FIG. 8, in some embodiments, the heat-exchanging component 20 further includes the connecting pipeline 24, communicating the first flow passage with the second flow passage.

In the embodiments, the connection between the first flow passage and the second flow passage can be made more flexible by using the connecting pipeline 24.

Exemplarily, in FIG. 8, the first flow passage is located at the inside of the first convex portion, and the second flow passage is located at inside of the third convex portion 223.

Figure 9:
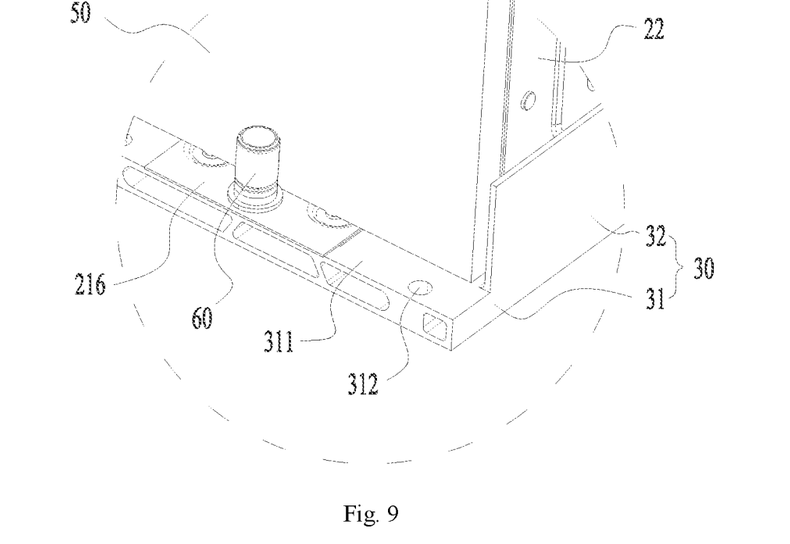
FIG. 9 shows an enlarged schematic view of the battery in FIG. 3 at a circular portion A.

FIG. 9 shows an enlarged schematic view of the battery in FIG. 3 at a circular portion A.

Referring to FIG. 3 and FIG. 9 together, in some embodiments, the battery 2 further includes two end plates 50, the two end plates 50 are respectively located at two ends of the battery unit 10 in the second direction X and clamp and hold the battery unit 10, and two ends of each of the end plates 50 in the first direction Y are respectively connected to the two second plate bodies 22. The two ends of the support portion 31 in the second direction X have mounting regions 311, and the mounting regions extends to outsides of the end plates 50 and are configured to be fixed to an external frame.

The two ends of the end plate 50 in the first direction Y may be connected to the two second plate bodies 22 by welding or the like. The two end plates 50 and the two second plate bodies 22 form a frame structure to fix the battery cells 11.

In the embodiments, the heat-exchanging component 20 is connected to the end plates 50 through the second plate bodies 22, so that it can improve the stability of the first plate body and reduce the risk of the first plate body being separated from the battery cells 11 when the battery 2 is shaken. The mounting regions 311 of the support portion 31 extend to the outsides of the end plates 50, so that the support portion 31 can be directly fixed to the external frame (such as the chassis of the vehicle), avoiding the end plates 50 from interfering with the connection between the support portion 31 and the external frame, simplifying the structure of the battery 2.

In some embodiments, the battery 2 further includes a joint 60. At least part of the first plate body protrudes to the outsides of the end plates 50 and is configured to mount the joint 60, and the joint 60 communicates with the first flow passage.

The joint 60 is configured to be connected with the external liquid supply pipeline. The joint 60 may include a liquid inlet joint and a liquid outlet joint, and the heat-exchanging medium flows into the first flow passage through the liquid inlet joint, and then flows out through the liquid outlet joint.

Exemplarily, the first plate body may include two protruding regions 216, and the protruding regions 216 protrude to the outsides of the end plates 50 and are configured to mount the liquid inlet joint and the liquid outlet joint respectively. The two protruding regions 216 may be respectively located at two ends of the first plate body in the second direction X, and may also be located at the same end of the first plate body in the second direction X.

In the embodiments, the joint 60 is mounted on the outsides of the end plates 50, thus the external liquid supply pipeline does not need to pass through the end plates 50, so that it can simplify the structure of the battery 2 and make the arrangement of the external liquid supply pipeline more flexible.

In some embodiments, each of the mounting regions 311 includes a mounting hole 312 passed through, and the mounting hole 312 is configured to be passed through by an external connector, so as to be fixed to the external frame by the external connector. In the thickness direction of the support portion 31, the mounting hole 312 is not covered by the heat-exchanging component 20.

Optionally, the external connector may be the fastening member, such as a bolt.

The mounting hole 312 may be one or more. The mounting hole 312 may be a threaded hole or a through hole without thread.

In the embodiments, the mounting hole 312 is not covered by the heat-exchanging component 20, so that it can prevent the heat-exchanging component 20 from interfering with the mounting of the external connector and simplify the mounting process between the battery 2 and the external frame.

In some embodiments, the protruding regions 216 are arranged to be spaced apart from the mounting hole 312 in the first direction Y, so that it can reduce the risk of interference between the joint 60 and the external connector.

In some embodiments, in a direction away from the support portion 31, each of the end plates 50 and each of the second plate bodies 22 extend beyond the battery cells 11, and an opening is formed at an end of the two end plates 50 and the two second plate bodies 22 away from the support portion 31.

Figure 10:
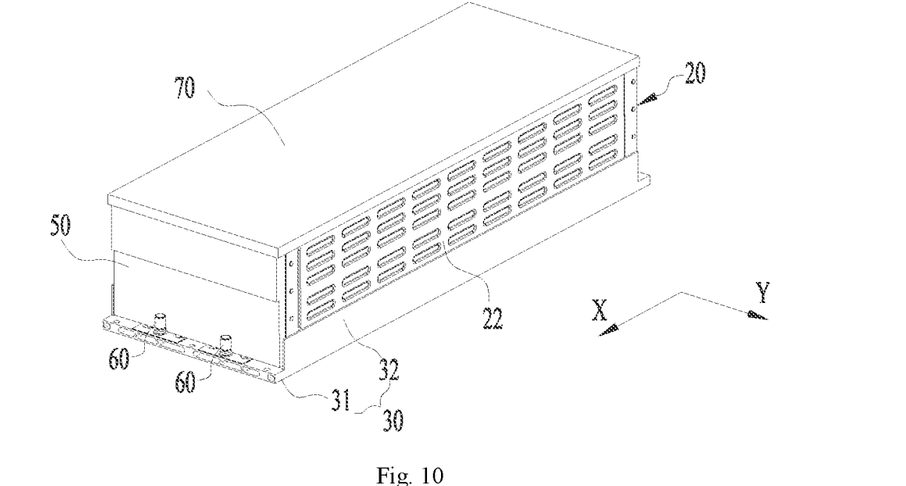
FIG. 10 shows a structural schematic view of a battery according to some other embodiments of the present application.

FIG. 10 shows a structural schematic view of the battery according to some other embodiments of the present application. As shown in FIG. 10, in some embodiments, the battery 2 further includes a cover plate 70, and the cover plate 70 is located at a side of the battery unit away from the support portion 31 and is connected to the end plates 50 and the second plate bodies 22 to close the opening.

The cover plate 70 may be of a plate-shaped structure or a hollow structure opened at a side.

The cover plate 70 may be connected to the end plates 50 and the second plate bodies 22 by welding, riveting, bonding or the like.

The cover plate 70, the end plates 50 and the heat-exchanging component 20 enclose a liquid enclosed space for accommodating the battery cells to prevent liquid or other foreign objects from affecting the charging or discharging of the battery cells. The battery cells do not need to be protected by the housing, and the battery 2 of the embodiments can be directly mounted to the electricity-consuming apparatus, so that the space utilization rate can be saved and improved and the used members can be reduced.

Figure 11:
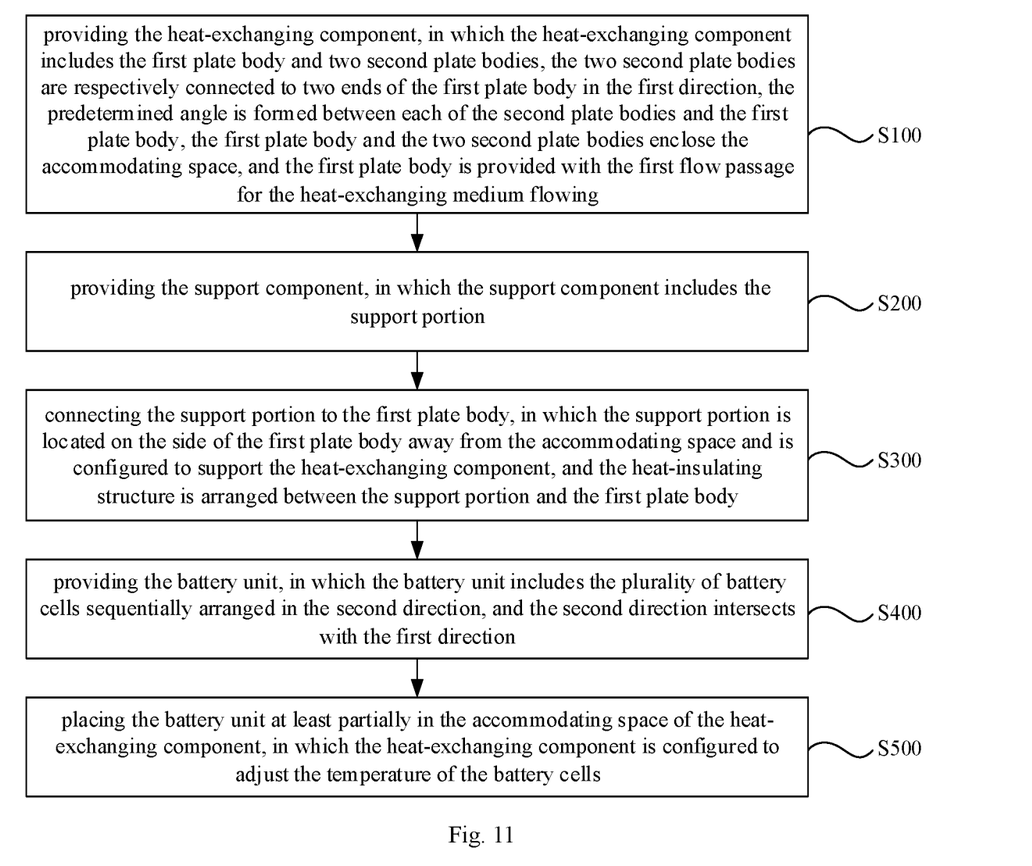
FIG. 11 shows a schematic flowchart of a method for manufacturing a battery according to some embodiments of the present application.

FIG. 11 shows a schematic flowchart of a method for manufacturing the battery according to some embodiments of the present application.

As shown in FIG. 11, a method for manufacturing the battery provided by the embodiments of the present application includes:

S100, providing the heat-exchanging component, in which the heat-exchanging component includes the first plate body and two second plate bodies, the two second plate bodies are respectively connected to two ends of the first plate body in the first direction, the predetermined angle is formed between each of the second plate bodies and the first plate body, the first plate body and the two second plate bodies enclose the accommodating space, and the first plate body is provided with the first flow passage for the heat-exchanging medium to flow therein;

S200, providing the support component, in which the support component includes the support portion;

S300, connecting the support portion to the first plate body, in which the support portion is located on the side of the first plate body away from the accommodating space and is configured to support the heat-exchanging component, and the heat-insulating structure is arranged between the support portion and the first plate body;

S400, providing the battery unit, in which the battery unit includes the plurality of battery cells sequentially arranged in the second direction, and the second direction intersects with the first direction; and S500, placing the battery unit at least partially in the accommodating space of the heat-exchanging component, in which the heat-exchanging component is configured to adjust the temperature of the battery cells.

It should be noted that the relevant structure of the battery manufactured by the above-mentioned method for manufacturing the battery can be referred to the battery provided in the above-mentioned embodiments.

When assembling the battery according to the above-mentioned method for manufacturing the battery, it is not necessary to follow the above steps in sequence. In other words, the steps may be performed in the order as mentioned in the embodiments, or the steps may be performed differently from the order as mentioned in the embodiments, or several steps may be performed at the same time. For example, steps S100, S200, and S400 can be performed in no particular order, and they can be performed at the same time.

Figure 12:
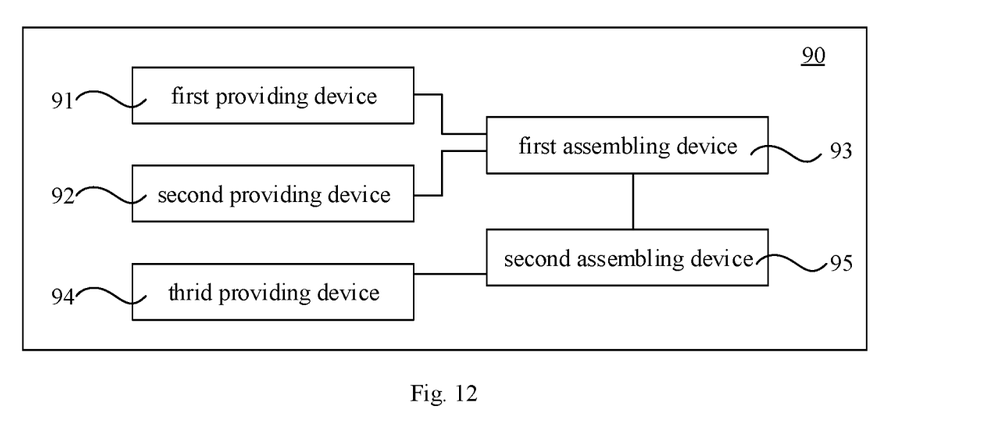
FIG. 12 shows a schematic block view of a system of manufacturing a battery according to some embodiments of the present application.

FIG. 12 shows a schematic block view of a system of manufacturing the battery according to some embodiments of the present application.

As shown in FIG. 12, the system of manufacturing the battery 90 provided by the embodiments of the present application includes:

a first providing device 91 for providing the heat-exchanging component, in which the heat-exchanging component includes the first plate body and two second plate bodies, the two second plate bodies are respectively connected to two ends of the first plate body in the first direction, the predetermined angle is formed between each of the second plate bodies and the first plate body, the first plate body and the two second plate bodies enclose the accommodating space, and the first plate body is provided with the first flow passage for a heat-exchanging medium to flow therein;

a second providing device 92 for providing the support component, in which the support component includes the support portion;

a first assembling device 93 for connecting the support portion to the first plate body, in which the support portion is located on the side of the first plate body away from the accommodating space and is configured to support the heat-exchanging component, and the heat-insulating structure is arranged between the support portion and the first plate body;

a third providing device 94 for providing the battery unit, in which the battery unit includes the plurality of battery cells sequentially arranged in the second direction, and the second direction intersects with the first direction; and a second assembling device 95 for placing the battery unit at least partially in the accommodating space of the heat-exchanging component, in which the heat-exchanging component is configured to adjust the temperature of the battery cells.

The relevant structure of the battery manufactured by the above-mentioned system of manufacturing the battery can be referred to the battery provided in the above-mentioned embodiments.

It should be noted that the embodiments in the present application and the features in the embodiments can be combined with one another if there is no conflict.

At last, it should be noted that the above embodiments are only used to illustrate the technical solutions of the present application, but not to limit the technical solutions; although the present application has been described in detail with reference to the embodiments as described above, those skilled in the art should understand that: it is still possible to modify the technical solutions recited in the embodiments as described above, or equivalently replace some of the technical features, but these modifications or replacements do not cause the essence of the corresponding technical solutions to deviate from the spirit and scope of the technical solutions of the embodiments of the present application.

What is claimed is:

1. A battery, comprising
   a heat-exchanging component, comprising a first plate body and two second plate bodies, wherein the two second plate bodies are respectively connected to two ends of the first plate body in a first direction, a predetermined angle is formed between each of the second plate bodies and the first plate body, an accommodating space is enclosed by the first plate body and the two second plate bodies, and the first plate body is provided with a first flow passage for a heat-exchanging medium to flow therein;
   a battery unit, wherein the battery unit is at least partially accommodated in the accommodating space of the heat-exchanging component, the battery unit comprises a plurality of battery cells sequentially arranged in a second direction, the heat-exchanging component is configured to adjust a temperature of the battery cells, and the second direction intersects with the first direction; and
   a support component, comprising a support portion located at a side of the first plate body away from the accommodating space, wherein the support portion is connected to the first plate body and is configured to support the heat-exchanging component, and a heat-insulating structure is arranged between the support portion and the first plate body;
   wherein the heat-insulating structure comprises a gap, and the gap is formed in at least a partial region between the support portion and the first plate body;
   the first plate body comprises a first main body, a first convex portion and a second convex portion, and the first convex portion and the second convex portion protrude from a surface of the first main body away from the accommodating space;
   in a thickness direction of the first main body, a size of the first convex portion protruding from the first main body is smaller than a size of the second convex portion protruding from the first main body, the second convex portion is configured to support the first main body on a surface of the support portion, and at least part of the gap is formed between the support portion and the first convex portion;
   the first flow passage is formed at an inside of the first convex portion.

2. The battery according to claim 1, wherein the heat-insulating structure further comprises a heat-insulating layer, and the heat-insulating layer is arranged in the gap.

3. The battery according to claim 1, further comprising two end plates, wherein the two end plates are respectively located at two ends of the battery unit in the second direction, and clamp and hold the battery unit; two ends of each of the end plates in the first direction are respectively connected to the two second plate bodies; two ends of the support portion in the second direction comprise mounting regions, the mounting regions extend to outsides of the end plates and are configured to be fixed to an external frame.

4. The battery according to claim 3, further comprising a joint, wherein at least part of the first plate body protrudes to the outsides of the end plates and is configured to mount the joint, and the joint communicates with the first flow passage.

5. The battery according to claim 3, wherein each of the mounting regions comprises a mounting hole passed through, and the mounting hole is configured to be passed through by an external connector to be fixed to the external frame by the external connector; in the thickness direction of the support portion, the mounting hole is not covered by the heat-exchanging component.

6. The battery according to claim 3, wherein in a direction away from the support portion, each of the end plates and each of the second plate bodies extend beyond the battery cells, and an opening is formed at an end of the two end plates and the two second plate bodies away from the support portion;
   the battery further comprises a cover plate located at a side of the battery unit away from the support portion and connected to the end plates and the second plate bodies to close the opening.

7. The battery according to claim 1, wherein the support component further comprises two position-limiting portions, the two position-limiting portions are located at a side of the support portion facing to the heat-exchanging component and connected to the support portion, and in the first direction, the two second plate bodies are located between the two position-limiting portions.

8. The battery according to claim 7, wherein each of the second plate bodies comprises a second main body, a third convex portion and a fourth convex portion, and the third convex portion and the fourth convex portion protrude from a surface of the second main body away from the accommodating space;
   in a thickness direction of the second main body, a size of the third convex portion protruding from the second main body is smaller than a size of the fourth convex portion protruding from the second main body, so that the fourth convex portion is pressed against the position-limiting portion;
   a second flow passage communicating with the first flow passage is formed at an inside of the third convex portion.

9. The battery according to claim 1, wherein a second flow passage communicating with the first flow passage is formed at an inside of the second plate bodies.

10. The battery according to claim 9, wherein the first flow passage and the second flow passage communicate with each other at a junction between the first plate body and each of the second plate bodies; or
    the heat-exchanging component further comprises a connecting pipeline, communicating the first flow passage with the second flow passage.

11. An electricity-consuming apparatus, comprising the battery according to claim 1, wherein the battery is configured to supply electric power.

12. A method for manufacturing a battery, comprising
    providing a heat-exchanging component that comprises a first plate body and two second plate bodies, wherein the two second plate bodies are respectively connected to two ends of the first plate body in a first direction, a predetermined angle is formed between each of the second plate bodies and the first plate body, an accommodating space is enclosed by the first plate body and the two second plate bodies, and the first plate body is provided with a first flow passage for a heat-exchanging medium to flow therein;

providing a support component that comprises a support portion;

connecting the support portion to the first plate body, wherein the support portion is located at a side of the first plate body away from the accommodating space and is configured to support the heat-exchanging component, and a heat-insulating structure is arranged between the support portion and the first plate body;

providing a battery unit that comprises a plurality of battery cells sequentially arranged in a second direction that intersects with the first direction; and placing the battery unit at least partially in the accommodating space of the heat-exchanging component, wherein the heat-exchanging component is configured to adjust a temperature of the battery cells;

wherein the heat-insulating structure comprises a gap, and the gap is formed in at least a partial region between the support portion and the first plate body;

the first plate body comprises a first main body, a first convex portion and a second convex portion, and the first convex portion and the second convex portion protrude from a surface of the first main body away from the accommodating space;

in a thickness direction of the first main body, a size of the first convex portion protruding from the first main body is smaller than a size of the second convex portion protruding from the first main body, the second convex portion is configured to support the first main body on a surface of the support portion, and at least part of the gap is formed between the support portion and the first convex portion;

the first flow passage is formed at an inside of the first convex portion.

13. A system of manufacturing a battery, comprising a first providing device for providing a heat-exchanging component that comprises a first plate body and two second plate bodies, wherein the two second plate bodies are respectively connected to two ends of the first plate body in a first direction, a predetermined angle is formed between each of the second plate bodies and the first plate body, an accommodating space is enclosed by the first plate body and the two second plate bodies, and the first plate body is provided with a first flow passage for a heat-exchanging medium to flow therein;

a second providing device for providing a support component that comprises a support portion;

a first assembling device for connecting the support portion to the first plate body, wherein the support portion is located at a side of the first plate body away from the accommodating space and is configured to support the heat-exchanging component, and a heat-insulating structure is arranged between the support portion and the first plate body;

a third providing device for providing a battery unit that comprises a plurality of battery cells sequentially arranged in a second direction, and the second direction intersects with the first direction; and a second assembling device for placing at least part of the battery unit in the accommodating space of the heat-exchanging component, wherein the heat-exchanging component is configured to adjust a temperature of the battery cells;

wherein the heat-insulating structure comprises a gap, and the gap is formed in at least a partial region between the support portion and the first plate body;

the first plate body comprises a first main body, a first convex portion and a second convex portion, and the first convex portion and the second convex portion protrude from a surface of the first main body away from the accommodating space;

in a thickness direction of the first main body, a size of the first convex portion protruding from the first main body is smaller than a size of the second convex portion protruding from the first main body, the second convex portion is configured to support the first main body on a surface of the support portion, and at least part of the gap is formed between the support portion and the first convex portion;

the first flow passage is formed at an inside of the first convex portion.

* * * * *